United States Patent [19]
Dupire
[11] 3,990,932
[45] Nov. 9, 1976

[54] TRANSFER METHOD OF APPLICATION OF SOLID COATING COMPOSITION

[76] Inventor: Pierre J. Dupire, 66 Avenue Maxence Van der Meersch, 59200 Tourcoing, France

[22] Filed: May 13, 1974

[21] Appl. No.: 469,127

[52] U.S. Cl. ................................ 156/230; 156/246; 260/851; 427/147; 427/148; 427/152; 428/914

[51] Int. Cl.[2] .................... B44C 01/18; B32B 31/20

[58] Field of Search ........... 156/231, 238, 246, 230; 428/914, 423, 500, 524; 427/146, 147, 148, 152; 260/851

[56] References Cited

UNITED STATES PATENTS 3,607,380 9/1971 Thams ........................... 156/231 X
3,630,802 12/1971 Dettling ............................. 156/231
3,650,880 3/1972 Tieniber.......................... 156/231 X

*Primary Examiner*—William A. Powell
*Assistant Examiner*—Thomas Bokan
*Attorney, Agent, or Firm*—Paul & Paul

[57] ABSTRACT

The present invention provides an improved resinous, cross-linkable solid coating composition and a method whereby the same is applied to a substrate in neutral medium by action of heat and pressure. The present invention is characterized by cross-linking of a resinous mixture including plasticizer and vulcanizing agents which saturate the multiple bonds of the substrate or those of its chemical functionalities.

7 Claims, No Drawings

TRANSFER METHOD OF APPLICATION OF SOLID COATING COMPOSITION

BACKGROUND OF THE INVENTION

The present invention pertains to an improvement in the application of solid coating compositions which may be transferred to a substrate under the action of heat and pressure.

It is known to undertake transfer of solid coating compositions comprised of various combinations of resins to a substrate by cross-linking these combinations of resins under the action of heat and pressure in an acid or alkaline medium. For example, it is possible to effect the cross-linking of various combinations of resins which are able to be applied when hot, when the composition to be cross-linked comprises functional groups such as hydroxyls, ethoxy, amino, amido, carboxyls or which may contain cross-linking groups which are blocked or deactivated by substitution, such as methoxy-methyl groups, for example, as described in French Patent No. 1,568,171, or ethoxy-methyl groups or the like in an acid medium. The temperature which is required, however, must be quite high, at least 140° C, and this frequently causes the degradation of some of the components. The only method which is carried out at relatively low temperature is that described in French Patent No. 1,520,562, example 2, 3 and 4. However, the compositions used therein have the drawback of only being usable for a limited period of time, i.e. the composition must be used within 24 to 48 hours after the addition of the acid catalyst and, furthermore, it cannot be used after the evaporation of the solvents. Moreover, in some instances, the catalyst reacts with certain materials, such as textile materials and coloring agents. Also, the minimum thickness of the coating must be 15 microns.

SUMMARY OF THE INVENTION

The present invention provides a remedy to the above-described drawbacks which are encountered when undertaking the cross-linking of resin systems as conducted heretofore in the prior art by making it possible to undertake the transfer of the solid coating composition to the substrate in a neutral medium with infinitely variable temperatures and fluidity, which depend upon the specific substrate to be treated.

In addition, it is possible to vary the flexibility and elasticity and, to a certain extent, the conditions of solubility and cross-linking of the resinous system by including in the latter, macromolecular combinations wherein the branches are located in the isotactic, syndiotactic or atactic positions. The position of the functional groups (cis or trans) of the molecules of the coating systems may also have an effect on the flexibility, elasticity, solubility or upon the conditions of melting and cross-linking.

DESCRIPTION OF THE PREFERRED EMBODIMENTS

The present invention is primarily characterized by the fact that cross-linking is obtained by the action of heat and pressure in a neutral medium, whereas in the prior art such was only possible in an acid medium. In accordance with the present invention it is unnecessary to resort to acid or alkaline catalysts. The heat utilized in accordance with the present invention causes melting of the coating composition to be transferred onto the appropriate substrate. The coating composition to be applied in accordance with the present invention is composed of a mixture of cross-linkable resins, plasticizer, melting and vulcanizing agents which, under the action of heat, liberate elements such as halogens or sulphur. These elements saturate the multiple bonds of the coating composition, opened under the action of heat, or those bonds of its chemical functionalities such as acid, hydroxyls, anhydrides, hydroxy, alcohols, aldehydes, ketones, amides, amines, imides, alkalines, sulphonates and isocyanates, liberated under the action of heat.

The present invention is also characterized by the fact that the system of resins cross-links at a temperature which may be fixed at will between 0° C and 300° C and, furthermore, that the cross-linking temperature is determined by the choice of specific resinous coating composition, by adding an accelerator that is a cross-linking or polymerisation agent, the choice of this accelerator being dependent upon the substrate to be treated and on the desired result. Nevertheless, the cross-linking temperature of the invention is clearly less than the temperature required for obtaining cross-linking by acid or alkyline catalyst systems. The resin system may be preserved for more than a year under normal conditions. In accordance with a preferred embodiment of the present invention, a film formed by the resin system, which may subsequently be cross-linked, may be continuous or discontinuous.

The following description is intended to provide several precise and non-limiting examples of coating composition applications in accordance with the present invention, in order to demonstrate how the transfer is undertaken in practice.

First, a resin system of the present invention is temporarily fixed to an anti-adhesive support, which may be paper or plastic material coated with silicone or polytetrafluoroethylene or the like, and which is applied, by any suitable means, such as, for example, impression, spraying, coating with a doctor blade, current of air, or roller, the resin system to be cross-linked being dissolved in an appropriate solvent. After application of the resinous coating composition to the substrate, the solvent is allowed to evaporate at a temperature less than the cross-linking temperature, whereby if the film of the resinous coating composition is formed on the anti-adhesive support, a film of plastic material whose pattern and thickness are chosen according to the characteristics of flexibility or rigidity desired in view of the ultimate use. The pattern may take the form, for example, of small square crosses, the sides of which have a length of about 8mm and a width of about 1.5mm, the vertical side having a thickness of about 10 microns and the horizontal side having a thickness of about 20 microns. The characteristics of flexibility and rigidity may be varied infinitely by imprinting crosses which are larger or smaller, more or less compact, of greater or lesser depth, or by utilizing various other patterns, such as, for example, dotted lines, dashes, continuous or broken lines, intersecting lines or the like. Also, the various dimensions of these patterns may be varied.

The constitution of this coating composition may be achieved by means of solutions of the compositions described in the following examples.

The film of resinous coating composition affixed to its support is brought into contact via its exposed resinous side to the substrate to be impregnated, coated, or stiffened, under heat and pressure, the latter being slight, if necessary, without the use of an acid or alkyline catalyst.

In the first stage, the resin is melted. In the second stage, which may vary from a fraction of a second to several minutes, depending upon the temperature and specific coating compositions chosen, the resin cross-links, thereby affixing itself positively to the substrate which is desired to be coated, stiffened or impregnated and becomes infusible and insensitive to solvents, the ingredients of dry-cleaning solutions, and to washing.

After affixing the film or resinous coating composition to the chosen substrate, the temporary support having anti-adhesive properties is removed and the resinous solid coating composition remains positively fixed to the substrate to be coated.

Due to the fact that the solid coating compositions of the present invention may be affixed to all types of articles, these cross-linkable resin systems are useful to stiffen, coat, and waterproof the articles, in particular textile articles, plastic materials, paper, and the like. These solid coating compositions may be used advantageously to give a certain quality to cloth and fabrics used in the manufacture of clothing, for example, to replace tailors' canvas. The method of the present invention has the advantage of providing a result superior to that obtained heretofore by conventional methods. For example, regarding a thermo-adhesive tailors' canvas prepared using a conventional process of applying heat, the canvas may come unstuck by the softening of the coating under the action of after-applied heat whereas a canvas coated by application of a resinous solid coating composition in accordance with the present invention is insensitive to after-applied heat and is resistant to the products normally used during dry-cleaning operations or washing and, consequently, does not deteriorate.

EXAMPLE 1

A substitute for tailors' canvas for use in the manufacture of an article of clothing, such as a jacket, dress, coat, raincoat, or the like, was manufactured as follows. 100g of a polyvinyl butyral resin, having the following composition;

| | |
|---|---|
| Polyvinyl butyral | 78 to 80% |
| Polyvinyl alcohol | 19 to 21% |
| Polyvinyl acetate | 1 to 3%, |

was dissolved along with 40g sulphonamide, 20g N-ethyl-toluene-sulphonamide, 22g precondensed melamine-formaldehyde resin, and 5g N-oxy-diethylene-2-benzothiazyl-sulphenamide in 250g methyl-ethyl-ketone. This solution was imprinted on a support comprising paper covered with a silicone coating, in order to form a discontinuous coating composed of small crosses in a staggered arrangement. This resin system may be preserved for more than a year under normal conditions.

The arrangement thus obtained was cut out like a tailors' canvas, and then placed on a cloth substrate, that is the substrate to be coated, with the discontinuous coating facing the cloth substrate and the entire arrangement was pressed, by means of an oil-heated press (although any other method for combining heat and pressure could have been used in accordance with the present invention), the temperature of which was adjusted to 135° C at a pressure of 50g/cm$^2$ for 20 seconds. The temperature of the coating, in this case, reached about 110° to 120° C. When the thus coated cloth left the press, the anti-adhesive paper support was removed and the coating remained positively attached to the cloth, whereby it fulfilled the function of tailors' canvas. A joining effect was produced by the imprinting of the small crosses and, owing to the differences in thickness of the various parts of the crosses, the cloth stiffened by this method was more flexible in the vertical direction of the crosses.

It was possible to add between 0.5 to 20g of hydrogenated tallow amide, for example, or other like products to the above formulation. In this case, owing to the meltability and wetting power of this product, the coating penetrated the substrate which was coated more deeply, thus making possible the regulation of the penetration depth depending upon the quantity of hydrogenated tallow amide added. It is thus possible to insure deep penetration of the thickest textile material. Also, since this addition makes the coating more fluid, it makes it possible to work with material, or substrate, over a broad range of temperature and pressure, it even being possible to work with irregular material. For example, when 2g of hydrogenated tallow amide were added to the coating composition prepared in accordance with this example, good results were obtained using pressure which varied from 20g/cm$^2$ to 5kgs/cm$^2$ and at temperatures varying from 125° C (contact time of about 40 seconds) to 200° C (varying contact time, the minimum being 1 second).

EXAMPLE 2

In accordance with the present invention a flexible coating was prepared. A more flexible formulation of the coating composition of the present invention was obtained by decreasing the amounts of N-oxy-diethylene-2-benzothiazyl-sulphenamide. For example, in the formulation in accordance with Example 1, above, the 5g portion of N-oxy-diethylene-2-benzothiazyl-sulphenamide were replaced by 0.5g of the same compound the preservation period being indefinite.

EXAMPLE 3

It is also possible to obtain a more flexible and more elastic product than that prepared in Example 1, by adding to the formulation a straight chain polyurethane, such as DESMOPAN-D-400 made by "BAYER", dissolved in 250g to 300g methyl-ethyl-ketone.

100g of a polyvinyl butyral resin of the following composition:

| | |
|---|---|
| Polyvinyl butyral | 78 to 80% |
| Polyvinyl alcohol | 19 to 21% |
| Polyvinyl acetate | 1 to 3%, |

with 10g glycerine, 30g toluene sulphonamide, 30g N-ethyl-toluene-sulphonamide, 25g DESMOPAN-D-400 (solution in 250g methyl-ethyl-ketone), 22g precondensed melamine-formaldehyde resin and 3g N-oxy-diethylene-2-benzothiazyl-sulphenamide were combined using a method similar to that of the foregoing Example 1. The resultant coating was more flexible and more elastic than that produced by the formulation of Example 1.

EXAMPLE 4

A product which was even more flexible than that obtained by the method and formulation of Example 3 was obtained by using HYPALON-40 (chlorinated polyolefin).

100g of polyvinyl butyral resin of the following composition:

| | |
|---|---|
| Polyvinyl butyral | 78 to 80% |
| Polyvinyl alcohol | 19 to 21% |
| Polyvinyl acetate | 1 to 3%. |

with 10g HYPALON-40 chlorinated olefin, 40g toluene sulphonamide, 20g N-ethyl-paratoluene sulphonamide, 22g precondensed melamine-formaldehyde resin, and 5g N-oxy-diethylene-2-benzothiazyl-sulphenamide were dissolved in 300g of solvent having the following composition:

| | |
|---|---|
| Methylene chloride | 50% |
| Toluene | 30% |
| Primary butanol | 20%. |

The method of production, coating and use of Examples 2, 3 and 4 was similar to that of Example 1. By way of variation of the four formulations of the above examples, it is possible to replace the precondensed melamine-formaldehyde resin with other resins having reactive aldehyde groups, such as, for example, urea, formaldehyde or phenol formaldehyde resins or the like. It is also possible to eliminate from these formulations the precondensed melamine-formaldehyde resin or the like, having reactive aldehyde groups, by using sulphur or by a resin producing sulphur at a temperature greater than 80° C, such as alkyl disulphide and/or aryl thiourea disulphides, for example, tetramethyl thiourea disulphide or the like.

Similarly, N-oxy-diethylene-2-benzothiazyl-sulphenamide may be replaced by a vulcanization activator or accelerator. By appropriately choosing the activator or accelerator, it is possible to vary the temperature required for obtaining the insolubility and infusibility of the product almost infinitely. For example, by using zinc phenyl-ethyl-dithiocarbamate in place of N-oxy-diethylene-2-benzothiazyl-sulphenamide, the qualities of infusibility and insolubility are obtained at a temperature of about 80° C to 100° C in place of 110° C to 120° C, respectively.

It is also possible to replace all or part of the N-oxy-diethylene-2-benzothiazyl-sulphenamide by a halogenated resin which liberates halogen at the desired temperature for cross-linking, for example an alkylated halogen-methyl-phenol-formaldehyde resin, such as S P 1056 supplied by SCHENECTADY. In this case, it is also possible to replace all or part of the precondensed melamine-formaldehyde resin.

Furthermore, it has been noted that the vulcanization activators and accelerators, as well as vulcanizing products or products liberating halogens, when they are used in conjunction with acid or alkaline catalysts, owing to a synergistic effect, make it possible to decrease the quantity of the catalysts in such proportions that their quantities in the formulation become so minimal, (i.e. up to 10 times less than the normal quantities used without vulcanizing or halogenated products), that their effect is significantly reduced and they no longer have any drawbacks. Owing to the same synergistic effect, it is also possible to decrease the quantities of vulcanization activators and accelerators as well as the quantites of vulcanizing or halogenated products.

As a further variation of these formulations, it is also within the purview of the present invention to add plasticizers and melting agents, more particularly plasticizers reacting with the products or ions supplied by the constituents of the formulation, (in the foregoing examples, sulphur or bromine ions), such as for example amino plasticizers or plasticizers containing thioderivatives or unsaturated plasticizers, (i.e. those containing double or triple bonds), or plasticizers having free chemical functions or even plasticizers which alone, or owing to their incorporation in the formulation used, resist the ingredients of dry-cleaning and washing and have no effect upon the melting temperature of the product after it is blocked by heat.

These formulations, when they are applied to an anti-adhesive support such that a continuous film is obtained after the solvents have evaporated, may be used as a protective or waterproofing agent. With a transparent formulation, it is possible to protect documents made from paper, cardboard or plastic material, to protect panels, to waterproof canvas or fabric while allowing the pattern and coloring to show through, and likewise to obtain a substitute for oilcloth, for furnishings, tarpolins and the like.

If, instead of applying the formulations of the resin systems of this invention to an anti-adhesive support, they are applied to various materials, all types of thermo-adhesive materials may be bound by means of heat and pressure to other materials, for example linings, lining textiles with textile material, paper, plastic material, fixing tailors' canvas etc.

It is also possible to obtain a thermo-adhesive product which is impermeable and resistant to wear, if the product is coated with a continuous film of a resin system in accordance with the present invention.

The present invention also has the advantage of facilitating storage of the resin systems provided in accordance therewith by allowing for a choice of cross-linking temperature in the coating composition. Depending upon the choice, the material may be stored in temperate countries and hot countries, while the resin system remains usable at the temperature of a hot iron.

Other uses of the compositions of this invention include coating of various panels made of fibrous materials, coating of agglomerated materials, building materials and wood, for example.

What is claimed is:

1. An improved method for application of a resinous solid coating composition to substrates, comprising:

a. providing a resinous, cross-linkable coating composition in a suitable solvent, characterized by the cross-linking of a resinous mixture including plasticizer and vulcanizing agents, said compositions cross-linking in a neutral medium under suitable conditions of temperature and pressure, said temperature being within the range of about 0° C to 300° C, and said cross-linkable composition capable of retaining fusibility properties for more than one year;

b. applying a coating of said composition to a suitable temporary anti-adhesive support means at a temperature below the cross-linking temperature of said composition;

c. allowing said coating on said anti-adhesive support means to dry to form a film thereon;

d. placing the exposed surface of said film in contact with a substrate to which said coating composition is to be applied;

e. subjecting said film in contact with said substrate to sufficient heat and pressure to initiate cross-linking of said composition, whereby said composition cross-links and forms a solid coating composition affixed to said substrate, said solid coating composition becoming infusible and insensitive to solvents, the ingredients of dry cleaning solution, and to washing; and then f. removing said anti-adhesive support means from said solid coating composition, whereby said application of said solid coating composition is completed.

2. The improved method of claim 1, wherein said suitable solvent in which said resinous, cross-linkable coating composition is provided is a solvent having a boiling point which is below the cross-linking temperature of said resinous, cross-linkable coating composition.

3. The improved method of claim 1, wherein said suitable anti-adhesive support means is a support means having a coating selected from the group consisting of silicone and polytetrafluorethylene.

4. The improved method of claim 1, wherein said film is a continuous film.

5. The improved method of claim 1, wherein said film is a discontinuous film.

6. The improved method of claim 1, wherein said solid coating composition is impermeable and resistant to wear.

7. The improved method of claim 1, wherein the fluidity of said resinous, cross-linkable coating composition may be varied.

* * * * *